United States Patent [19]

Passemard et al.

[11] Patent Number: 4,537,084
[45] Date of Patent: Aug. 27, 1985

[54] RECTILINEAR TRANSFER MECHANISM WITH PULLEYS AND BELTS

[75] Inventors: Jean R. Passemard, Bailly Romainvilliers; Gaston Kélédjian, Boulogne Billancourt, both of France

[73] Assignee: Regie Nationale des Usines Renault, Boulogne-Billancourt, France

[21] Appl. No.: 416,714

[22] Filed: Sep. 10, 1982

[30] Foreign Application Priority Data

Sep. 15, 1981 [FR] France .................. 81 17427

[51] Int. Cl.$^3$ .................. F16H 27/02; F16H 29/02
[52] U.S. Cl. .................. 74/89.22; 74/89.2; 74/471 XY; 267/71
[58] Field of Search .................. 74/89.2, 89.22, 89.21, 74/471 XY; 267/69, 70, 71, 72

[56] References Cited

U.S. PATENT DOCUMENTS

| | | | |
|---|---|---|---|
| 55,344 | 6/1866 | Nell | 267/71 |
| 1,006,950 | 10/1911 | Keddy | 267/71 |
| 1,921,402 | 8/1933 | Wiley | 74/89.2 |
| 1,932,305 | 10/1933 | Escole | 267/71 |
| 2,588,642 | 3/1952 | Malsbary | 74/98 |
| 2,677,923 | 5/1954 | Parker | 74/89.2 |
| 2,820,187 | 1/1958 | Parsons et al. | 74/424.8 |
| 2,837,707 | 6/1958 | Stokes | 74/424.8 |
| 3,003,357 | 10/1961 | Votta, Jr. | 74/89.2 |
| 3,267,812 | 8/1966 | Hunkeler | 409/10 |
| 3,429,195 | 2/1969 | Bassoff | 74/89.2 |
| 3,645,144 | 2/1972 | Barrows, Jr. | 74/89.2 |
| 4,059,021 | 11/1977 | Spauel et al. | 74/89.2 |
| 4,161,004 | 7/1979 | Dalziel | 74/89.2 |
| 4,170,146 | 10/1979 | Owens | 74/89.2 |
| 4,198,871 | 4/1980 | Dunn et al. | 74/89.2 |

FOREIGN PATENT DOCUMENTS

| | | |
|---|---|---|
| 1102515 | 3/1961 | Fed. Rep. of Germany . |
| 1198914 | 12/1959 | France . |
| 1359372 | 3/1964 | France . |
| 2334891 | 7/1977 | France . |
| 99570 | 6/1923 | Switzerland . |
| 299015 | 8/1954 | Switzerland . |
| 377166 | 6/1964 | Switzerland . |

Primary Examiner—Lawrence J. Staab
Assistant Examiner—Michael David Bednarek
Attorney, Agent, or Firm—Oblon, Fisher, Spivak, McClelland & Maier

[57] ABSTRACT

A mechanism to set in motion the rectilinear transfer of a moving body sliding in relation to a support is disclosed. A servomotor drives a shaft in rotation. The rotation is transformed by pulleys and belts. Two belts are staggered along the shaft axis and are wound on two pulleys of the same diameter. A first end of each of these belts is attached to the corresponding pulley, while the second end of each of these belts is attached to the moving body, the winding directions being opposite so that each rotation in one direction or the other of the shaft causes the winding of one of the belts and the unwinding of the other. Application is to Cartesian displacement robot arms and devices of rectilinear transfer with cross-motions back and forth and up and down.

6 Claims, 4 Drawing Figures

RECTILINEAR TRANSFER MECHANISM WITH PULLEYS AND BELTS

BACKGROUND OF THE INVENTION

The invention concerns a mechanism meant for transforming the rotation of a shaft into the rectilinear movement of a body in relation to a support including the bearings of said shaft. The motion transformation is provided by pulleys and belts, in particular, thin metal (foil) belts wound on cylindrical-rim pulleys.

SUMMARY OF THE INVENTION

The invention resides in using two opposite belts staggered along the shaft axis and wound on two pulleys of the same diameter, each belt having its first end fixed on the corresponding pulley and its second end fixed directly or indirectly on the moving body, the winding direction of the two pulleys being opposite, so that the rotation of the shaft in one direction or the other causes the winding of one belt and the unwinding of the other.

According to the conditions of use, the invention can take on at least one of two principal forms. In the case where the length of the moving body in the direction of displacement is greater than the corresponding length of the support, the two ends of the two belts are fixed on the moving body at mounting points which are far apart, from which the two belts converge towards a double pulley, both belts being situated in one plane tangent to the two pulleys.

Conversely, in the case where the length of the moving body in the direction of displacement is smaller than the corresponding dimension of the support, the ends of the two belts are fixed on the moving body at points which are closer together and from which they diverge, one towards a pulley of the double pulley, placed at one end of the support, and the other, which is in a set-off position, towards a guide pulley placed at the other end of the support. From there, the other belt returns by a return side to the other pulley of the double pulley. In order that each belt can wind by more than one turn on a pulley, it is planned to provide the pulley with a groove on one side of its cylindrical periphery, said groove merging with the cylindrical periphery in the out-going direction of the belt by a large-radius fillet. The belt is fixed inside the groove, which is then covered by a complementary piece of a shape which reconstitutes the initial cylindrical surface above the first end of the belt. The belt, formed of high-strength thin metallic sheets, can advantageously be fitted with reinforcements soldered or glued to the belt ends. The belt can be secured in the groove by a centering pin which traverses perforations in the pulley, the reinforcements and the complementary piece. The complementary piece is fixed on the pulley, by a screw, for example.

As a further feature, the invention provides for placing an elastic compensation device between the second end of the belts and the moving body, in the first embodiment with the moving body longer than the support, or instead inserted in the return side of the belt passing over the guide pulley in the second embodiment in which the moving body is shorter than the support. In this last case, the second belt is itself cut into two parts between which is placed the compensation device at a place which always remains between the double pulley and the guide pulley. The compensation device consists of a stack of conical washers, arranged between a cylindrical housing and an axial shaft, with a micrometer screw for adjusting the compression of the stack of washers.

The invention is particularly applicable to a double displacement robot arm, the first embodiment being employed for the horizontal displacement of the arm in a support plate, whereas the second embodiment is utilized to displace the support plate in relation to a further support, the first support plate then constituting the moving body.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
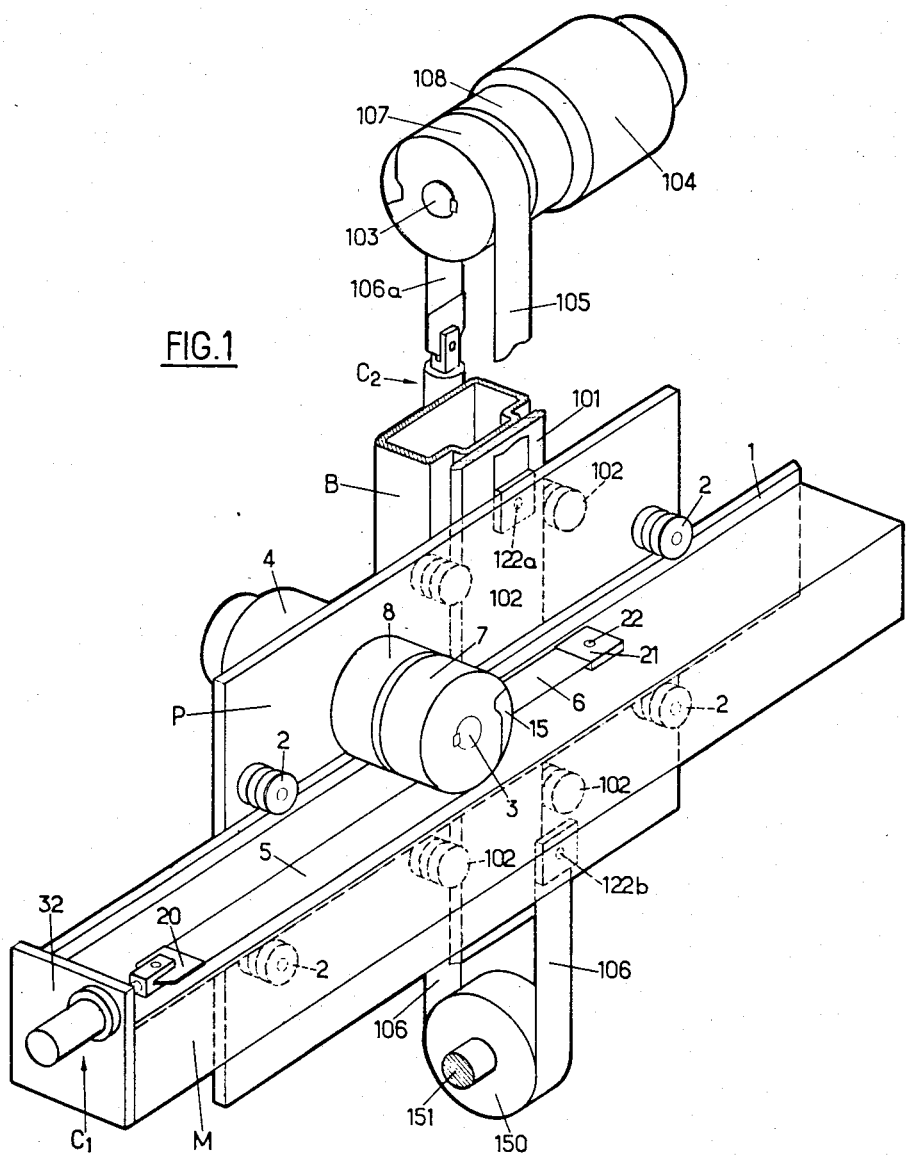
FIG. 1 is a perspective view, partially in section, of a double displacement mechanism combining the two embodiments.

According to the invention, as seen in FIG. 1, it is desirable to displace a moving body M in relation to a fixed support plate P. The moving body M is slidably mounted in the plate P by means permitting rectilinear sliding motion. For example, a roller guide 1 fixed to the moving body M includes on two opposing sides edges bevelled at 45°. The roller guide 1 is carried by four rollers 2 which rotate around axes fixed to the plate P, each of the rollers including a V-shaped groove of a contour corresponding to that of the bevelled edges of the roller guide 1. Naturally, these rollers are precisely positioned and fixed so as to suppress all loose play. One can assume, for simplicity, that the moving body M travels horizontally.

To produce rectilinear reciprocating movement of the moving body M in relation to the plate P, a shaft 3 is arranged to be driven in rotation by an appropriate electro-mechanical or hydraulic device, shown schematically by a servomotor 4 with two directions of rotation.

According to the invention, the transformation of the rotating movement of the shaft 3 to a linear movement of the moving body M is obtained by using two belts 5 and 6, with opposite actions, staggered along the shaft axis 3 and wound on two pulleys, 7 and 8 respectively, of the same diameter, which consequently can be united in a single cylinder.

Figure 2:
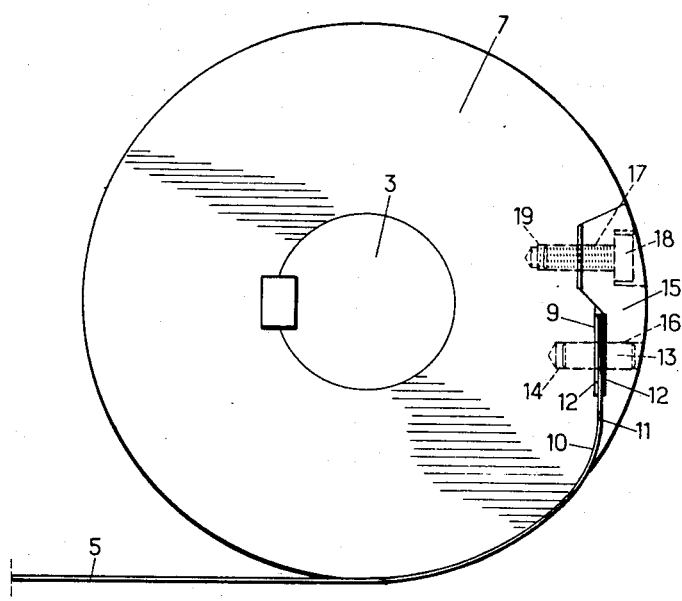
FIG. 2 is a larger-scale transverse cut of one element of the double pulley showing the attachment of the corresponding belt.

To permit a sufficient range of displacement of the moving body M without requiring too large a diameter for the two pulleys, resulting in a torque too elevated for servomotor 4, (in other words, to allow belts 5 and 6 to be wound by more than one turn on the respective pulleys 7 and 8) it is preferable to use the method of attachment shown in FIG. 2 to fix the first end of each of these belts on the corresponding pulley 7 or 8.

For this, the pulley 7, keyed onto the shaft 3, has on its periphery a straight groove 9 inside the cylindrical periphery of the pulley and which is joined with this cylindrical periphery by a large-radius fillet 10 in order to avoid sharply bending belt 5. This belt 5 consists of a thin metallic foil sheet, or high-resistance very thin steel ribbon. The first end 11 of the sheet in contact with the pulley 7 preferably has a reinforcement consisting of two plates 12 which are each soldered onto one of the faces of this end 11. This reinforcement is positioned in the rectilinear groove 9 and is precisely fixed in position by a centering pin 13 which traverses an opening cut into the end 11 and its reinforcement 12, and extends through a hole 14 cut into the pulley. Moreover, according to the invention, a complementary piece 15, of which the inner contour follows the contour of the groove 9 and the reinforcement, and of which the outside contour constitutes the cylindrical surface of the pulley 7, covers the groove 9 and fillet 10.

The complementary piece 15 also includes an opening 16 for passage of the centering pin 13, as well as another bolstered opening 17 permitting passage of a fastening screw 18 which is screwed in a threaded hole 19 of the pulley. In this way, upon rotation of pulley 7, after belt 5 is wound in a complete turn, it is wound again on itself on a radius increased by only a minute quantity, owing to the thinness of the belt used.

Naturally, the other pulley 8 includes a similar mounting for belt 6, but oriented in the opposite direction.

The second end 20 of belt 5, and end 21 of belt 6, likewise includes reinforcements 12 in order to allow for the attachment of these two ends to the moving body M.

Figure 3:
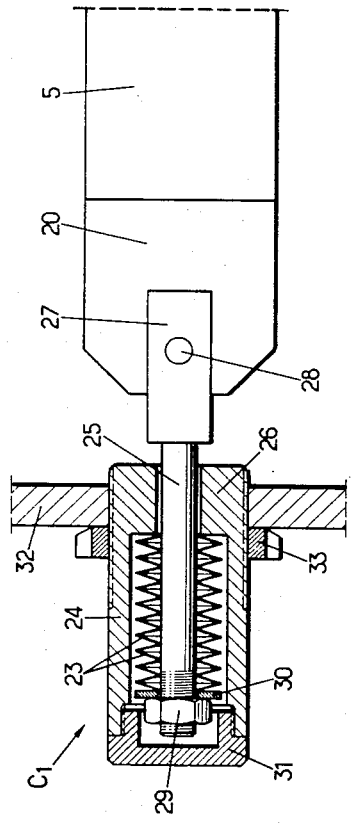
FIGS. 3 and 4 show in axial cut, and at larger scale, a detail of the elastic compensation devices in the two embodiments, respectively.

However, if end 21 is fixed directly on the moving body M, for example, by means of a screw 22, the other end 20 is preferably fixed on the moving body M by the intermediary of an elastic compensation device $C_1$, shown in detail in FIG. 3. The elastic compensation device includes a compression spring, formed of a stack of elastic washers 23 contained in a cylindrical housing 24. A rod 25 extends through the spring and the housing 24. Its outside end includes a strap 27 in which end 20 is fixed by means of a traversing attachment 28. The other end of the rod 25 is threaded and includes a screwnut 29 which supports, by the intermediary of a thrust washer 30, the elastic piling 23. The housing 24 can be closed by a cap 31, and the assembly including the housing 24, threaded on the outside with a fine threading, is fixed to and crosses a partition 32 at the end of the moving body M. A notched screw-nut 33 is screwed on the thread part of the housing and into abutment with the partition 32 for adjustment of the compressions of the elastic washers 23.

This device thus allows precise adjustment of the pre-stress of the assembly of belts 5 and 6, it being known that an excess of tension risks the breaking of these belts while insufficient tension will not permit the moving body M to exercise the desired pull without introducing unwanted play. This elastic compensation device $C_1$ is thus useful in all cases, and in particular in the case where the winding of the belts includes more than one turn, in order to evenly compensate for the minute variations of the winding radius as described above.

The above embodiment is applicable, whatever may be the orientation of the displacement, to all cases where the length of the moving object in the direction of displacement is much larger than the corresponding length of the support, which in this case is P. In this case, the double pulley 7-8 is arranged between the ends 20 and 21, the rectilinear parts of belts 5 and 6 are in one plane, tangent to the assembly of the two pulleys, and the belts extend between the points 20 and 21, and the double pulley 7 and 8.

It is possible, however, to provide another embodiment in cases where the length of the moving body in the direction of displacement is shorter than the corresponding length of the support. In this case, it is preferable to place a double pulley at one end of the support, a supplementary guide pulley at the other end, and to locate the moving body between these two ends.

To illustrate this second embodiment, the application to the vertical displacement of the support P in relation to a support B, will be shown. In this embodiment, it is important to note that the support P, which in the first embodiment was considered the support on which the moving body M slides, now constitutes the moving body which slides vertically in relation to support B. Since both embodiments could be combined such that body M moves on body P which further moves on support B, such a combination is illustrated in FIG. 1.

Concerning the device for guidance of sliding motion, as in the preceding embodiment, it can be constituted by a roller guide 101 together with four grooved rollers 102, but since the moving body P is now shorter and the support B is now vertically longer, the roller guide 101 now is fixed to the stationary support B, and the rollers 102 move with the support P, whereas in the first embodiment it is the roller guide 1 which is movable and the rollers 2 are fixed in position. The reference numbers 103 to 108 designate elements identical to elements 3 to 8 from the preceding embodiment, except the length of the belts, which is set for the desired course of displacement.

The major difference results from the fact that the two points of attachment 122a and 122b of belts 105 and 106 are relatively close together, since they are adapted to the vertical dimensions of the support P. The belts 105 and 106 are always staggered axially along the shaft axis 103. From the two points of attachment 122a and 122b the two belts 105 and 106 diverge. Belt 105 extends towards pulley 107 and is connected thereto as in the previous embodiment. The other belt 106 extends towards an additional guide pulley 150 rotatable around shaft 151 which is parallel to shaft 103. The two belts 105 and 106 are thus always in one plane which is tangent to the double pulley 107 and 108 and to the guide pulley 150. From pulley 150. the belt 106 extends towards the element 108 of the double pulley 107-108.

Figure 4:
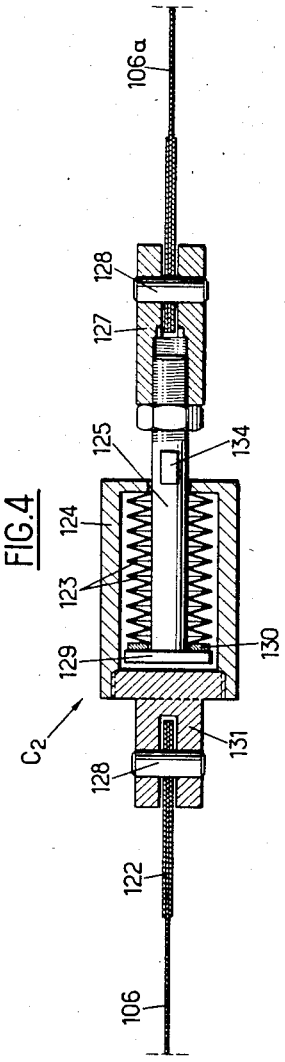

To assure the elastic compensation of the prestress of the belets, the belt 106 could be connected directly to pulley 108, but it is preferable to adapt the preceding elastic compensation device $C_1$ in the form of elastic equalizer $C_2$, shown in detail in FIG. 4, mounted in the return side of the belt 106 going from the guide pulley 150 to the double pulley 107, 108. For this, the return side is divided into two parts, 106 and 106a, as is shown in FIG. 1.

In this embodiment, the housing 124 containing the elastic washers 123, instead of being supported on the fixed part 32, is attached to the reinforced end 122 of the belt 106 by the intermediary of a cap 131 which is in the shape of a strap to allow for an attachment pin 128. To compensate for the absence of the possiblity of adjustment at 131, the strap 127 is attached in an adjustable manner at the end of the rod 125, for example, by means of a threaded connection and a lock-nut, as is shown. The nut 29 is replaced by a head 129 which is fixed to the rod 125 and is supported, still by the intermediary of a thrust washer 130, by the elastic washers 123. To allow the rotation of the rod 125 necessary for adjustment, two bars 134 fit onto the part of rod 125 passing out of the housing 124 and provide a gripping element for rotating the rod.

Naturally, the elastic equalizer $C_2$ is positioned at a point on belt 106—106a which always remains between the double pulley 107-108 and the guide pulley 150.

This second method of embodiment, concerning the case where the moving body is shorter than the support, can be used for movement in all directions, and in the particular case that has just been described, where the assembly of the support P and the horizontal arm M move vertically, one can naturally compensate for the weight of this moving assembly in the usual manner by means of a counter-weight, which is not shown.

Such a double displacement arm for horizontal and vertical motion is particularly adapted for a robot arm with Cartesian displacement, in which case it is particularly desirable to have large courses of displacement and large reduction ratios for the outputs of the servomotors, as well as less cumbersome pulleys. Nevertheless, the invention applies equally in all the cases when one wants to transform the rotation of a shaft to a rectilinear movement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for providing rectilinear sliding motion of a first object in a first direction in relation to a relatively fixed second object, said first object being longer than said second object in said first direction, said apparatus comprising:
    means connected to one of said objects for guiding said motion;
    a motor fixed to said second object, said motor having an output shaft rotatable about an axis transverse to said first direction;
    first and second pulleys having the same diameter and fixedly mounted on said shaft in axially staggered relation;
    a straight groove formed in each of said first and second pulleys, each said groove merging with the cylindrical peripheral surface of a corresponding one of said pulleys by a large diameter fillet, each said groove being capped by a complementary piece having an outer surface which is shaped to reconstruct the cylindrical surface of said pulley, said grooves and fillets of said two pulleys having opposite senses;
    a first belt having a first end inserted and fixed in said groove of said first pulley, said first belt having a second end fixed relative to said first object at a first point;
    a second belt having a first end inserted and fixed in said groove of said second pulley, said second belt having a second end fixed relative to said first object at a second point, wherein said first and second belts are wound on said first and second pulleys in opposite rotational directions, whereby rotation of said motor shaft causes one belt to be wound and the other belt to be simultaneously unwound [.]; and
    means for moving said second object in a second direction, transverse to said first direction, in relation to a relatively fixed third object, said third object being longer than said second object in said second direction, said means for moving comprising:
    (a) means connected to one of said second and third objects for guiding the motion of said second object relative to said third object;
    (b) a second motor fixed relative to said third object and having an output shaft rotatable about an axis transverse to said second direction;
    (c) third and fourth pulleys mounted on said output shaft of said second motor, said third and fourth pulleys being respectively indentical to said first and second pulleys;
    (d) a third belt having a first end fixed to said third pulley and a second end fixed to said second object;
    (e) a fourth belt having a first end fixed to said fourth pulley and a second end fixed to said second object; and
    (f) an elastic tensioning device associated with said fourth belt for tensioning said fourth belt.

2. The apparatus of claim 1 including an elastic compensation device for tensioning said first and second belts, said elastic compensation device comprising:
    a housing fixed to an element movable relative to said first and second pulleys;
    a rod having one end inserted in said housing and a second end fixed to one of said first and second belts;
    an elastic component enclosed in said housing and engaging said one end of said rod for biasing said housing towards said second end of said rod.

3. The apparatus of claim 2 wherein said housing is fixed to said one of said first and second belts.

4. The apparatus of claim 2 wherein said housing is fixed to said first object.

5. The apparatus of claim 2 wherein said elastic compensation device includes means for adjusting the compression of said elastic component, said means for adjusting comprising a screw thread and adjustment nut on a component coaxial with said housing.

6. The apparatus of claim 4 wherein said first and second pulleys are positioned between said first and second points, and wherein said end of said rod is fixed to said second end of one of said first and second belts.

* * * * *